(12) United States Patent
DesJardins

(10) Patent No.: US 6,483,869 B1
(45) Date of Patent: Nov. 19, 2002

(54) FREQUENCY DECIMATED DMT MODULATION MODEM

(75) Inventor: Philip Andre DesJardins, Nevada City, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/164,144

(22) Filed: Sep. 30, 1998

(51) Int. Cl.$^7$ .............................. H04B 1/38; H04L 5/16; H04L 27/28; H04K 1/10
(52) U.S. Cl. ....................................... 375/222; 375/260
(58) Field of Search ................................ 375/219, 222, 375/259, 260, 261, 295, 377; 370/203, 204, 206, 210; 455/59

(56) References Cited

U.S. PATENT DOCUMENTS 6,092,122 A * 7/2000 Liu et al. ..................... 375/377

* cited by examiner

*Primary Examiner*—Betsy L. Deppe
(74) *Attorney, Agent, or Firm*—McDonnell, Boehnen, Hulbert & Berghoff

(57) ABSTRACT

A sub-rate modulation method that is compatible with full-rate ADSL modems. The method may be used to implement a reduced complexity transceiver, preferably remotely located from the central office or service provider. The method includes instructing the full-rate modem to transmit data using a subset of available carriers; receiving the subset of carriers at the remote location; and performing a reduced complexity time-to-frequency domain transform. The full rate modem is instructed to use every other carrier, resulting in a transmitted time domain sequence that is cyclic—the first half of the symbol is identical to the second half. As a result, the first half of the symbol is treated as an extended cyclic prefix by the sub-rate ADSL modem, resulting in the elimination of the need to perform time-domain equalization at the sub-rate ADSL modem receiver. This substantially reduces the amount of signal processing required by the sub-rate ADSL transceiver. In addition, local echo cancellation need not be performed during the first half of the received symbol period since these values are not utilized in the demodulation process.

6 Claims, 3 Drawing Sheets

FREQUENCY DECIMATED DMT MODULATION MODEM

BACKGROUND OF THE INVENTION

A. Field of the Invention

The present invention relates to telecommunication devices. More particularly, the method of the present invention relates to a simplified modulation format. The method is readily applied to asymmetric digital subscriber line (ADSL) modems.

B. Description of the Related Art

Asymmetric Digital Subscriber Line

Asymmetric Digital Subscriber Line (ADSL) is a communication system that operates over existing twisted-pair telephone lines between a central office and a residential or business location. It is generally a point-to-point connection between two dedicated devices. ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

Discrete Multi-Tone Modulation

Discrete Multi-Tone (DMT) uses a large number of sub-carriers spaced close together. Each subcarrier is modulated during training using Quadrature Phase Shift Keying, or QPSK. During normal data transmission mode, the modulation used in ADSL is Quadrature Amplitude Modulation (MQAM). The data bits are mapped to a series of symbols in the I-Q complex plane, and each symbol is used to modulate the amplitude and phase of one of the multiple tones, or carriers.

In some ADSL transceivers, the symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Discrete Fourier Transforms (IDFT). There are many well-known forms of the DFT and IDFT, often referred to generically as fast Fourier transforms (FFT) and inverse fast Fourier transforms (IFFT).

The symbol period in ADSL modems is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band. The appropriate loading of each carrier is determined during initial training and analysis periods.

Because the symbol is relatively long and is preceded by a guard band, intersymbol interference is a less severe problem than with single carrier, high symbol rate systems. Furthermore, because each carrier has a narrow bandwidth, the channel impulse response is relatively flat across each sub-carrier frequency band. The DMT standard for ADSL, ANSI T1.413, specifies 256 sub-carriers, each with a 4.3125 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning to maintain orthogonality. Because of the periodic nature of the DFT, no discontinuity in the time-domain channel is generated between the symbol and the extension. It has been shown that if the channel impulse response is shorter than the length of the periodic extension, sub-channel isolation is achieved.

Time domain equalization is often performed to reduce the apparent length of the channel. impulse response. A frequency domain equalizer is able to remove channel distortion only in the case where the channel impulse response is shorter than the cyclic prefix. In full-rate ADSL data transmission, the receiver may perform time domain equalization prior to the conversion to the frequency domain in order to shorten the effective impulse response so that its length is less than the length of the cyclic prefix.

The signal processing associated with ADSL modems, specifically that associated with echo cancellation, equalization and DMT modulation/demodulation, is typically performed after the signal waveform is sampled. The processing is then performed on the digital signal. Because of the high bandwidth and the correspondingly high sample rate, the digital signal processing exceeds the capabilities of typical digital signal processors (DSP) that have been used quite successfully in the implementation of POTS-type modems. As a result, ADSL modems for subscriber devices, e.g., personal computers and other remote terminals, are significantly more expensive than traditional analog POTS-type modems. It has been generally understood that the increased cost is acceptable in view of the greatly enhanced data transmission capabilities of ADSL.

SUMMARY OF THE INVENTION

A sub-rate modulation method that is compatible with full-rate ADSL modems is provided. The method may be used to implement a reduced complexity transceiver, preferably remotely located from the central office or service provider. The method includes instructing the full-rate modem to transmit data using a subset of available carriers; receiving the subset of carriers at the remote location; and performing a reduced complexity time-to-frequency domain transform.

The full rate modem is instructed to use every other carrier, resulting in a transmitted time domain sequence that is cyclic—the first half of the symbol is identical to the second half. As a result, the first half of the symbol is treated as an extended cyclic prefix, resulting in the elimination of the need to perform time-domain equalization at the sub-rate ADSL modem receiver. This substantially reduces the amount of signal processing required by the sub-rate ADSL transceiver. In addition, local echo cancellation need not be performed during the first half of the received symbol period since these values are not utilized in the demodulation process.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
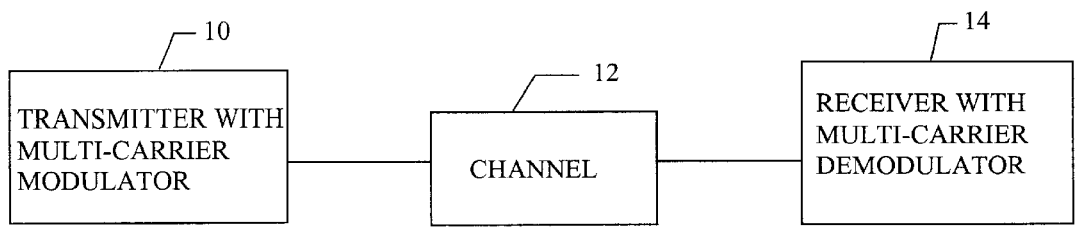
FIG. 1 depicts a block diagram of a multi-carrier communication system.

An ADSL communication system is shown in FIG. 1. Transmitter 10 employs a multi-carrier modulator, utilizing Discrete Multi-Tone (DMT) modulation. The DMT modulator may be implemented by mapping the data values to symbols specified by the magnitude and phase of each carrier, and then performing an inverse discrete Fourier transform (IDFT). The time domain sequence is then transmitted over channel 12, which includes the effects of the subscriber line twisted pair wire and the analog components and amplifiers of the analog front ends of the ADSL transceivers. The receiver 14 includes a DMT demodulator. The demodulator may be implemented using a discrete Fourier transform (DFT), for which there are many algorithms, to recover the magnitude and phase of the symbols on each carrier It is understood that in a typical ADSL configuration, each end of the communication channel utilizes both a transmitter and receiver, making an ADSL transceiver. The downstream transmission direction (from the central office or service provider to the subscriber) utilizes a wider bandwidth than the return direction, or upstream direction. The method described herein below enables the remote ADSL transceiver to operate in a simplified mode by utilizing a subset of the available carriers.

Figure 2:
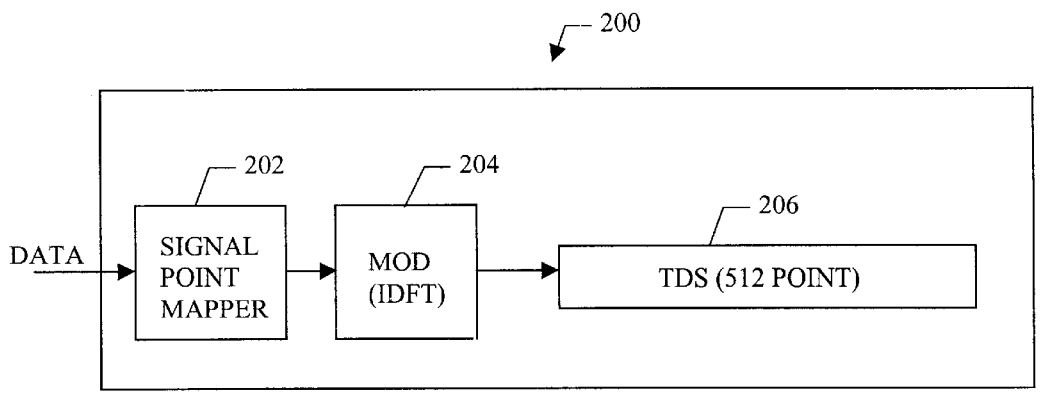
FIG. 2 shows a block diagram of a multi-carrier transmitter.

With reference to FIG. 2, a typical ADSL transmitter 200 is described. Incoming data signals are mapped to symbols by signal point mapper 202. The mapper provides complex-valued signal points (i.e., points having a real component and an imaginary component, alternatively expressed as a magnitude and phase, as is well known in the art) selected from a signal constellation. The constellation points represent the magnitude and phase of each individual carrier. Thus, these constellation points represent the modulated signal in the frequency domain. To obtain the corresponding time domain signal that is to be transmitted over the channel, an inverse discrete Fourier transform (IDFT) may be utilized to transform the constellation points to a time domain sequence.

Figure 3:
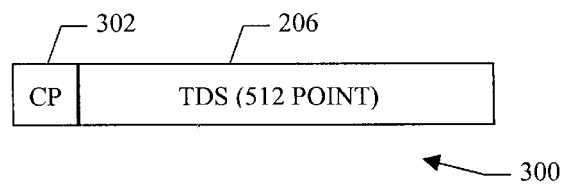
FIG. 3 shows a diagram of a frame of transmit data.

In ADSL transmission systems, two-hundred fifty six (256) carriers may be used thus 256 constellation points are specified by mapper 202. Because the time-domain signal must be real valued, the 256 complex-valued frequency domain points are extended to a total of 512 points by using the complex conjugates of the original 256 points. The result of the IDFT performed by the modulator 204 on the 512 point sequence is a real-valued time domain sequence (TDS) 206 having a length of 512 time domain values. The time domain sequence 206 is then processed by adding a cyclic prefix (CP) 302 to form a frame of transmit data 300, as shown in FIG. 3. As is well known in the art, the cyclic prefix is added to preserve orthogonality of the carriers even after distortion by the channel 12.

The discrete samples are converted to analog form and transmitted over the channel. At the distant end, a full-rate ADSL receiver samples the received signal and processes the received points by performing a discrete Fourier transform (DFT) on the 512 time domain signal samples. Of course, only the first 256 points are calculated to obtain the original constellation points. A frequency domain equalizer may then be implemented to correct for channel distortion. The frequency domain equalizer consists of a single tap filter for each carrier frequency.

Figure 4:
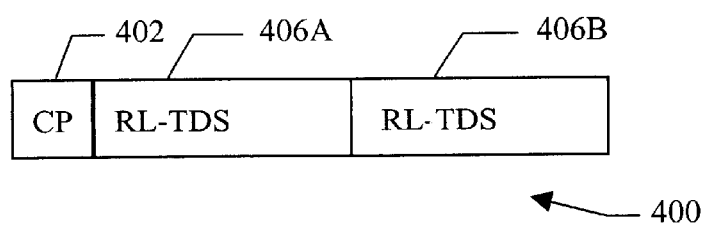
FIG. 4 shows a diagram of a frame of transmit data using a subset of carriers.

In the preferred embodiment, the sub-rate subscriber unit requests that the full-rate transceiver transmit on every alternate carrier. That is, every other carrier is unused. As a result of the IDFT performed on a sequence of constellation points having a zero value for every other point, the TDS 206 produced by the IDFT module 204 resembles the TDS shown in FIG. 4. The time domain sequence produced by the full-rate ADSL transmitter contains time domain sequences 406A and 406B, which are identical. That is, the time domain values contained in 406A are actually identical to those in 406B. Each sequence 406A, 406B contains 256 points. The full transmit frame 400 is made up of the time-domain sequence 406A and 406B, together with the cyclic prefix 402. Cyclic prefix 402 is calculated in the same manner as during full-rate operation.

Figure 5:
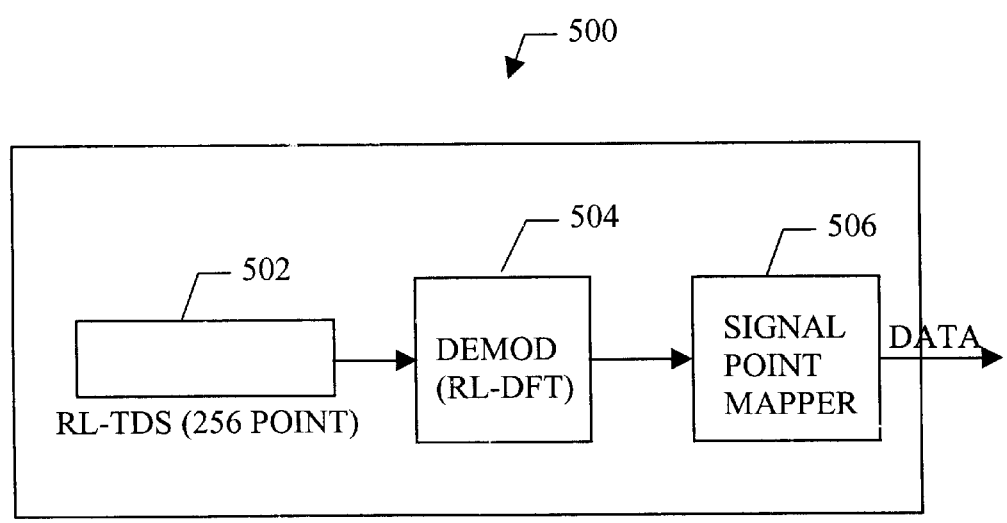
FIG. 5 shows a block diagram of a sub-rate receiver.

The TDSs 406A and 406B are treated as reduced length TDSs (RL-TDS) by the sub-rate ADSL transceiver, depicted in FIG. 5. The signal points are recovered from the RL-TDS by performing a reduced length DFT (RL-DFT) having 256 points (where only 128 DFT output points are actually calculated, because the remaining 128 points are the reversed-ordered complex conjugates). The RL-TDS 406A acts as a cyclic prefix to RL-TDS 406B. Thus, the RL-DFT is performed on the second half of the received symbol, sequence RL-TDS 406B.

Figure 6:
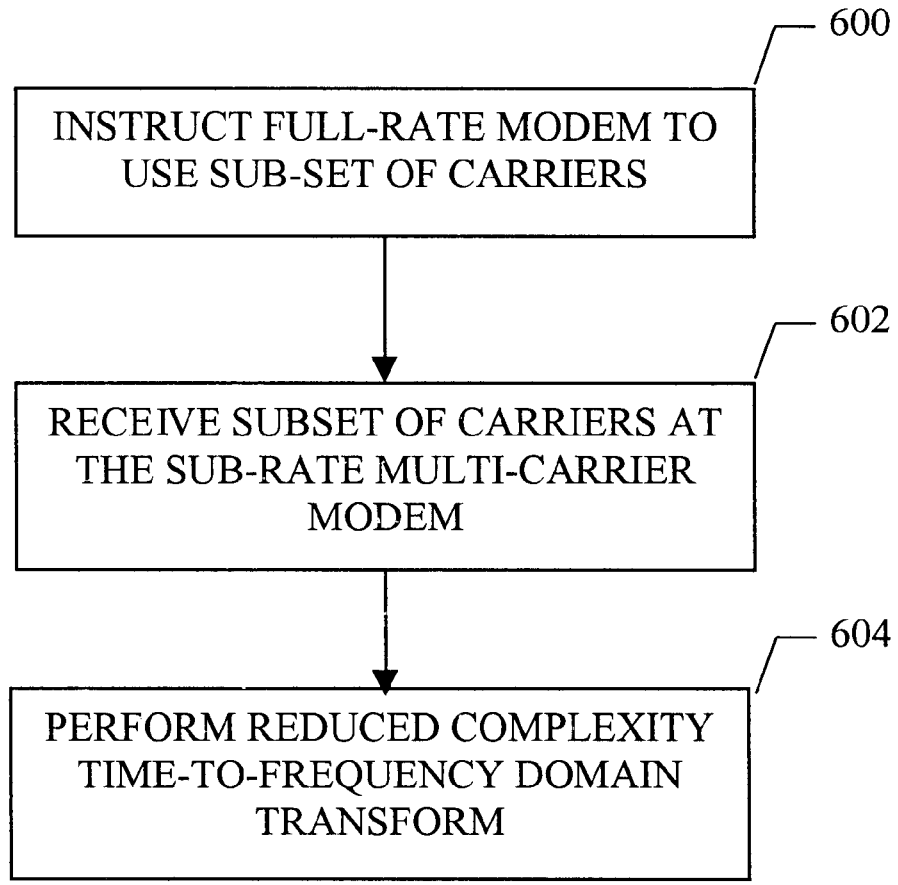
FIG. 6 shows a flow chart for a preferred embodiment of the invention.

The flow chart of FIG. 6 depicts the method used by the sub-rate multi-carrier modem. At step 600 the full-rate modem is instructed to use a sub set of available carriers. Preferably, the full-rate modem is instructed to use every other carrier frequency. Every even frequency may be used, or, alternatively, every odd frequency may be used. Preferably the sub-rate multi-carrier modem instructs the full-rate modem to use every other carrier by specifying a bit-loading of zero bits for the corresponding carriers. This is referred to as a bit-loading table. Because every other carrier is not used, the transmitter may also be instructed to utilize full power on the carriers that are used without resulting in excessive power transmission.

In step 602 the subset of carriers is received by the sub-rate modem. Standard signal processing is performed on the received signal to accomplish frame synchronization, timing recovery, and the like. In step 604 the signal is transformed to the frequency domain via a reduced-complexity transform. A DFT requires on the order of $Nlog_2N$ multiplications. As stated above, a full-rate ADSL receiver utilizes a 512 point DFT. Thus, $512log_2(512)=512*9=4608$ multiplications. As a result of the use of a subset consisting of every other carrier, and the corresponding result of performing a 256 point DFT, the number of multiplications required is only $256log_2256=256*8=2048$. The number of calculations is also significantly reduced by obviating the need for time domain equalization, and the elimination of echo cancellation during one half of the symbol time.

Preferred embodiments of the present invention have been described herein. It is to be understood, of course, that changes and modifications may be made in the embodiment without departing from the true scope of the present invention, as defined by the appended claims.

I claim:

1. A method of data transmission using a full-rate multi-carrier modem and a subrate multi-carrier modem, the method comprising the steps:

instructing the full-rate multi-carrier modem to transmit data using alternate carriers of all available carriers;

receiving the alternate carriers at the sub-rate multi-carrier modem; and performing a reduced complexity time-to-frequency domain transform on the received carriers.

2. The method of claim 1 further comprising the step of transmitting a bit-loading table to the full-rate multi carrier modem requesting bit loading of zero bits on the carriers between the alternate carriers.

3. The method of claim 1 wherein the step of performing a reduced complexity time-to-frequency domain transform further comprises sampling the received signal over a symbol length and performing a discrete Fourier transform.

4. The method of claim 3 wherein the discrete Fourier transform is performed using samples from one-half of the symbol length.

5. The method of claim 1 wherein the full-rate multi-carrier modem is an ADSL modem compliant with ANSI specification T1.413.

6. The method of claim 1 further comprising the step of instructing the full-rate modem to transmit using full power on the alternate carriers.

* * * * *